United States Patent [19]

Kudo et al.

[11] Patent Number: 6,124,369
[45] Date of Patent: Sep. 26, 2000

[54] PROCESS FOR PRODUCING ORGANOSILICON RESIN, AND PROCESS FOR PRODUCING POLYURETHANE FOAM BY USING THE ORGANOSILICON RESIN OBTAINED BY THAT PROCESS

[75] Inventors: Muneo Kudo; Shinichi Morioka; Mitsuo Asai, all of Annaka, Japan

[73] Assignee: Shin-Etsu Chemical Co., Ltd., Tokyo, Japan

[21] Appl. No.: 09/397,635

[22] Filed: Sep. 16, 1999

[30] Foreign Application Priority Data

Sep. 21, 1998 [JP] Japan .................................. 10-266846

[51] Int. Cl.$^7$ ....................................................... C08G 18/61
[52] U.S. Cl. ............................. 521/112; 521/110; 521/155
[58] Field of Search ..................... 521/110, 112, 521/155

[56] References Cited

U.S. PATENT DOCUMENTS 4,855,329  8/1989  Blevins et al. ........................... 521/112
4,883,825  11/1989  Westfall et al. .......................... 521/112

Primary Examiner—Morton Foelak
Attorney, Agent, or Firm—Oblon, Spivak, McClelland, Maier & Neustadt, P.C.

[57] ABSTRACT

A process for producing an organosilicon resin is disclosed. The process includes the steps of equilibrating a mixture of silane compounds of $Si(OR^3)_4$ wherein $R^3$'s are a monovalent hydrocarbon group having 1 to 6 carbon atoms; $R^2Si(OR^4)_3$ wherein $R^2$ is a monovalent hydrocarbon group having 1 to 20 carbon atoms, and $R^4$'s are a monovalent hydrocarbon group having 1 to 6 carbon atoms; and $R^1_3SiX$ wherein X is an —OH group, an —OSiR$^1_3$ group or a hydrolyzable group, and $R^1$'s are a monovalent hydrocarbon group having 1 to 6 carbon atoms; adding water to the product of the equilibration reaction to carry out hydrolysis reaction; and adding an aqueous alkali to the product of the hydrolysis reaction to carry out condensation reaction. The organosilicon resin obtained is well dispersible in a resin premix containing a polyol, a blowing agent, a catalyst and a foam stabilizer, and also is highly hydrophobic and low reactive. Hence, the resin premix containing the organosilicon resin has good storage stability. Accordingly, this resin premix need not be agitated when used and also can provide polyurethane foams having superior properties such as dimensional stability.

11 Claims, No Drawings

PROCESS FOR PRODUCING ORGANOSILICON RESIN, AND PROCESS FOR PRODUCING POLYURETHANE FOAM BY USING THE ORGANOSILICON RESIN OBTAINED BY THAT PROCESS

BACKGROUND OF THE INVENTION

1. Field of the Invention

This invention relates to a process for producing an organosilicon resin, and a process for producing a polyurethane foam by using the organosilicon resin obtained by that process. More particularly, this invention relates to a process for producing a polyurethane foam superior in properties such as dimensional stability because of an improvement in storage stability of a resin premix.

2. Description of the Prior Art

Polyurethane foams are commonly produced by blowing and curing a polyurethane foam composition containing a polyol, a polyisocyanate, water or carbon dioxide as a blowing agent, and an amine as a catalyst. Before use or during storage, this composition is usually divided into the polyisocyanate and a resin premix prepared by mixing the polyol, the blowing agent, the catalyst and a foam stabilizer. In such a production process, for the purpose of improving the appearance and other physical properties of the resulting foams, it is proposed to add to the resin premix an additive which is incompatible with it. This additive is useful for improving dimensional stability of the resulting polyurethane foams especially in the case of compositions making use of water as the blowing agent. Proposed as the additive of this type are, for the production of semi-hard polyurethane foams, carbon black (Japanese Laying-open Patent Publication (Kokai) No. 55-135128); and, for the production of hard polyurethane foams, powdery or fibrous potassium titanate (Japanese Laying-open Patent Publication (Kokai) No. 56-14535) and an organosilicon compound having as structural units an $R_3SiO_{1/2}$ unit (wherein R's are the same or different and each represent a monovalent hydrocarbon group having 1 to 6 carbon atoms) and an $SiO_2$ unit (Japanese Laying-open Patent Publication (Kokai) No. 5-19469/ or its corresponding U.S. Pat. No. 2,722,952).

These additives, however, are not compatible with the resin premix, and hence have had problems that they separate from the resin premix or deteriorate because of an alkali catalyst in the resin premix, making it impossible to exhibit the intended properties of improving dimensional stability. Accordingly, it has conventionally been necessary to agitate the resin premix so as to be uniformly mixed and dispersed, before its use, i.e., before it is mixed with the polyisocyanate to cause reaction (foaming and curing), bringing about another problem that foaming means are restricted, e.g., the resin premix can not be used in spray foaming. In order to solve these problems, it has been sought to develop an additive which is compatible with the resin premix and therefore well dispersible in the resin premix and is highly hydrophobic and low reactive.

SUMMARY OF THE INVENTION

Accordingly, an object of the present invention is to provide a process for producing an organosilicon resin which can solve the above problems in the production of polyurethane foams and also is useful as an additive which is well dispersible in the resin premix and is highly hydrophobic and low reactive.

Another object of the present invention is to provide a process for producing a polyurethane foam which process makes use of the organosilicon resin so that the resin premix can be improved in storage stability, the resulting polyurethane foam can be improved in dimensional stability and also the spray foaming can be applied.

The present invention provides a process for producing an organosilicon resin having as structural units an $R^1_3SiO_{1/2}$ unit wherein $R^1$'s are the same or different and each represent a monovalent hydrocarbon group having 1 to 6 carbon atoms, an $R^2SiO_{3/2}$ unit wherein $R^2$ represents a monovalent hydrocarbon group having 1 to 20 carbon atoms, and an $SiO_{4/2}$ unit; the process comprising the steps of:

subjecting a mixture of a compound selected from the group consisting of a silane compound represented by the general formula (I):

$$Si(OR^3)_4 \qquad (I)$$

wherein $R^3$'s are the same or different and each represent a monovalent hydrocarbon group having 1 to 6 carbon atoms, and a hydrolysis-condensation product thereof;

a compound selected from the group consisting of a silane compound represented by the general formula (II):

$$R^2Si(OR^4)_3 \qquad (II)$$

wherein $R^2$ represents a monovalent hydrocarbon group having 1 to 20 carbon atoms, and $R^4$'s are the same or different and each represent a monovalent hydrocarbon group having 1 to 6 carbon atoms, and a hydrolysis-condensation product thereof; and a silane compound represented by the general formula (III):

$$R^1_3SiX \qquad (III)$$

wherein X represents an —OH group, an —OSiR$^1_3$ group or a hydrolyzable group, and $R^1$'s are the same or different and each represent a monovalent hydrocarbon group having 1 to 6 carbon atoms;

to equilibration reaction with an acid;

adding water to the product of the equilibration reaction to carry out hydrolysis reaction; and adding an aqueous alkali to the product of the hydrolysis reaction to carry out condensation reaction.

The present invention also provides a process for producing a polyurethane foam by blowing and curing a polyurethane foam composition comprising a polyol, water, a catalyst, a surfactant and a polyisocyanate;

the process comprising the step of mixing a resin premix containing the polyol, the water, the catalyst and the surfactant, with the polyisocyanate to cause the composition to foam and cure;

the resin premix containing the organosilicon resin obtained by the process described above.

The organosilicon resin obtained by the above organosilicon resin production process is compatible with the resin premix of the polyurethane foam composition and well dispersible in the resin premix and also is highly hydrophobic and low reactive. Hence, it can stably be stored over a long period of time, without separation from the resin premix with time and deterioration due to alkali catalysts. Also, polyurethane foams having superior properties such as dimensional stability can be obtained from the composition prepared using the resin premix in which this organosilicon resin has been added. In addition, the composition can also be utilized in spray foaming.

DETAILED DESCRIPTION OF THE INVENTION

The present invention will be described below in detail.

The organosilicon resin can be produced in the following way.

First, a mixture of the compound selected from the group consisting of a silane compound represented by the above general formula (I) and a hydrolysis-condensation product thereof, the compound selected from the group consisting of a silane compound represented by the above general formula (II) and a hydrolysis-condensation product thereof and the silane compound represented by the above general formula (III) (hereinafter "material mixture") is equilibrated with an acid. Next, water is added to the product of the equilibration reaction to carry out hydrolysis reaction, and then an aqueous alkali is added to the product of the hydrolysis reaction to carry out condensation reaction. Incidentally, these equilibration reaction, hydrolysis reaction and condensation reaction are usually carried out in organic solvents.

Specific examples of the compounds constituting the material mixture are as shown below.

Specific examples of the silane compound represented by the general formula (I), include alkoxysilanes such as tetramethoxysilane, tetraethoxysilane, tetraisopropoxysilane and tetrabutoxysilane. Specific examples of the hydrolysis-condensation product of the silane compound represented by the general formula (I), include methyl silicate and ethyl silicate. These silane compounds and hydrolysis-condensation products thereof may each be used alone or in combination of two or more.

Specific examples of the silane compound represented by the general formula (II), include alkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane and hexyltrimethoxysilane. Hydrolysis-condensation products of these silane compounds may also be used. These silane compounds and hydrolysis-condensation products thereof may each be used alone or in combination of two or more. In particular, the silane compound represented by the general formula (II) may preferably be a mixture of the compound of that formula wherein $R^2$ is a methyl group and the compound of that formula wherein $R^2$ is a monovalent hydrocarbon group having 3 to 10 carbon atoms.

Specific examples of the silane compound represented by the general formula (III), include silanol compounds such as trimethylsilanol and triethylsilanol, chlorosilanes such as trimethylchlorosilane and triethylchlorosilane, alkoxysilanes such as trimethylmethoxysilane and trimethylethoxysilane, aminosilanes such as trimethylsilyldimethylamine and trimethylsilyldiethylamine, acyloxysilanes such as trimethylacetoxysilane, and disiloxanes such as hexamethyldisiloxane. These silane compounds may each be used alone or in combination of two or more. Also, the above silane compound and a hydrolysis-condensation product thereof may be used in the form of a mixture.

In the material mixture, the silane compound represented by the general formula (II) and/or the hydrolysis-condensation product thereof may preferably be contained in such an amount that from 0.5 to 1.0 mole, particularly from 0.7 to 0.9 mole, of the $R^2SiO_{3/2}$ unit is present per mole of the $SiO_{4/2}$ unit in the silane compound represented by the general formula (I) and/or the hydrolysis-condensation product thereof. In particular, more preferred is such an amount that from 0.05 to 0.3 mole of the $R^2SiO_{3/2}$ unit (wherein $R^2$ is a hexyl group) is present per mole of the $SiO_{4/2}$ unit. Also, in the material mixture, the silane compound represented by the general formula (III) and/or the hydrolysis-condensation product thereof may preferably be contained in such an amount that 0.5 to 1.5 mole, particularly from 0.8 to 0.9 mole, of the $R^1{}_3SiO_{1/2}$ unit is present per mole of the $SiO_2$ unit in the silane compound represented by the general formula (I) and/or the hydrolysis-condensation product thereof.

As specific examples of the acid used in the equilibration reaction, it may include sulfonic acids such as methanesulfonic acid, and sulfuric acid. The acid may preferably be added in an amount of from 0.5 to 2% by weight, and particularly from 1 to 1.5% by weight, based on the weight of the material mixture used.

As the organic solvent used in the step of equilibration reaction, any solvents may be used without any particular limitations so long as they are capable of dissolving the material mixture and the equilibration reaction product, and also compatible with water (hereinafter "hydrophilic organic solvent"), as exemplified by alcohols such as methyl alcohol, ethyl alcohol, propyl alcohol, isopropyl alcohol and butyl alcohol; cellosolves such as methyl cellosolve, ethyl cellosolve, butyl cellosolve and cellosolve acetate; ketones such as acetone and methyl ethyl ketone; and ethers such as dioxane and tetrahydrofuran. Alcohols are preferred.

In the step of hydrolysis reaction, the water may be added in an amount of from 0.5 to 1.5 moles, preferably from 0.8 to 1.0 mole, per mole of hydrolyzable groups such as alkoxyl groups contained in the material mixture used.

As the organic solvent used in the step of hydrolysis reaction, any solvents may be used without any particular limitations so long as they are capable of dissolving the equilibration reaction product and the hydrolysis reaction product, and also compatible with water. It may specifically include the hydrophilic organic solvent exemplified in the step of equilibration reaction.

As specific examples of the aqueous alkali used in the condensation reaction, it may include aqueous potassium hydroxide solution, aqueous sodium hydroxide solution, aqueous ammonia, aqueous dimethylamine and aqueous diethylamine. The aqueous alkali may be added in an amount of from 1.0 to 1.5 moles, preferably from 1.05 to 1.4 mole, per mole of the acid used in the step of equilibration reaction.

As the organic solvent used in the condensation reaction, any solvents may be used without any particular limitations so long as they are capable of dissolving the hydrolysis reaction product and the condensation reaction product (i.e., the organosilicon resin) and also incompatible with water. It may specifically be exemplified by aliphatic hydrocarbons such as hexane, cyclohexane and isoparaffin; and aromatic hydrocarbons such as benzene, toluene and xylene. Aromatic hydrocarbons are preferred.

The organosilicon resin thus obtained dissolves in non-reactive siloxanes such as decamethylcyclopentasiloxane and octamethylcyclotetrasiloxane, or organic solvents such as the above hydrocarbons capable of dissolving organosilicon resin, and is compatible and well dispersible in the resin premix and also highly hydrophobic and low reactive. This organosilicon resin is dissolved in the above organic solvent and thereafter added in the resin premix.

The organosilicon resin itself may preferably be added in the resin premix in an amount of from 0.01 to 20 parts by weight, more preferably from 0.1 to 5 parts by weight, and particularly preferably 0.5 part by weight, based on 100 parts by weight of the polyol.

The polyol, catalyst and surfactant other than the organosilicon resin, constituting the resin premix, and the polyisocyanate to be mixed with the resin premix may all be those conventionally used in the production of polyurethane foams.

More specifically, the polyol may include, e.g., polyether polyols such as polyethylene glycol and polypropylene glycol, and hydroxyl-group-containing compounds such as polyesters, acrylic polyols, castor oil derivatives and tall oil derivatives.

The catalyst may include, e.g., amine compounds such as tetramethylhexamethylenediamine, pentamethyldiethylenetriamine, triethylamine and triethylenediamine, and tin catalysts such as stannous chloride and dibutyltin laurate. In the resin premix, the catalyst may preferably be contained in an amount of from 0.0001 to 0.1, and particularly from 0.001 to 0.01, in an weight ratio of the catalyst to the polyol.

There are no particular limitations on the surfactant (foam stabilizer). It may preferably be, e.g., a polyether siloxane such as dimethylpolysiloxane-polyoxyethylene-polyoxypropylene copolymer. In the resin premix, the surfactant may preferably be contained in an amount of from 0.0001 to 0.1, and particularly from 0.001 to 0.05, in a weight ratio of the surfactant to the polyol.

The water may preferably be contained in the resin premix in an amount of from 0.001 to 0.5, and particularly from 0.01 to 0.3, in a weight ratio of the water to the polyol.

Besides, in the resin premix, a flame retardant, a filler and so forth may be added so long as the effect of the present invention is not damaged.

The polyisocyanate may include, e.g., tolylene diisocyanate, diphenylmethane diisocyanate, hexamethylene diisocyanate, methaxylylene diisocyanate, xylylene diisocyanate, and derivatives or hydrogenated products of these. The polyisocyanate may preferably be used in the composition in an amount that provides an isocyanate index of from 50 to 150, and particularly from 80 to 110.

In the present invention, the polyurethane foam composition is blown and cured by mixing the resin premix in which the organosilicon resin has been added, with the polyisocyanate. Foaming means may be the same as that for conventional polyurethane foams. Low-pressure foaming and high-pressure foaming are available, and free foaming, spray foaming, frothing or non-frothing may be used.

EXAMPLES

The present invention will be described below in greater detail by giving Examples and Comparative Examples. In the following, "part(s)" is "part(s) by weight" in all occurrences.

Example 1

Into a one-liter reaction vessel made of glass, having a stirrer, a dropping funnel and a thermometer, 73.6 g of hexamethyldisiloxane, 16.5 g of hexyltrimethoxysilane (available from Shin-Etsu Chemical Co., Ltd., trade name: KBM3063), 96.7 g of a hydrolysis-condensation product of methyl trimethoxysilane (available from Shin-Etsu Chemical Co., Ltd., trade name: KC89R), 150 g of ethyl polysilicate (available from Colcoat Co., Ltd., trade name: KEISAN40), 4.21 g of methanesulfonic acid and 37.4 g of isopropyl alcohol were introduced and mixed. The resulting mixture was kept at 40° C. for 2 hours to carry out equilibration reaction, followed by addition of 68.3 g of water to carry out hydrolysis reaction at 70° C. for 2 hours. To the resulting reaction product, 111 g of xylene was added, and thereafter 7.6 g of aqueous 50% potassium hydroxide solution was added. The resulting mixture was kept at 72 to 78° C. for 8 hours, and thereafter, after the alcohol was evaporated off, further kept at 135 to 142° C. for 10 hours to carry out condensation reaction. To the resulting reaction product, 264 g of xylene was added, which was then washed with water until it turned neutral. The solvent of the organic layer was stripped to obtain 70 g of organosilicon resin.

A resin premix was prepared by adding 100 parts of a polyol (available from Takeda Chemical Industries, Ltd., trade name: POLYOL ACTCALL GR-46), 1.7 parts of tetramethylhexamethylenediamine (TMHDA) as the catalyst, 6.2 parts of water as the blowing agent, 1 part of a surfactant, dimethylpolysiloxane-polyoxyethylene-polyoxypropylene copolymer (available from Shin-Etsu Chemical Co., Ltd., trade name: F-373) as the foam stabilizer, and a solution prepared by adding 0.5 part of the above organosilicon resin in 0.5 part of decamethylcyclopentasiloxane.

The resin premix thus obtained was left at 50° C. for 3 days. Nevertheless, no settlements were seen, and the resin premix was found stable.

To the resin premix having been thus aged, a polyisocyanate (available from Sumitomo Bayer Urethane Co., Ltd., trade name: ISOCYANATE SUMIDUME 444V-20) was so added as to be in an isocyanate index of 110, to cause the resulting composition to foam and cure. Thus, a hard polyurethane foam was obtained. The density of this polyurethane foam was measured, and the appearance of the polyurethane foam having been left in a high-temperature high-humidity (70° C., 95% RH) environment for 2 days was also examined.

Results obtained are shown in Table 1. As can be seen from the table, this polyurethane foam showed a low density and a good dimensional stability. Thus, the resin premix caused neither separation of the organosilicon resin nor deterioration, and the intended properties were accomplished.

Examples 2 to 10

Organosilicon resins were prepared in the same manner as in Example 1 except that the amount of the hexamethyldisiloxane, the amount of KBM3063, the amount of KC89 and the amount of the aqueous 50% potassium hydroxide solution were changed as shown in Table 1. Using these organosilicon resins, resin premixes were prepared in the same manner as in Example 1, and their storage stability was examined in the same way. Polyurethane foams were also produced in the same way using these resin premixes to examine foam characteristics.

Results obtained are shown in Table 1.

Comparative Examples 1 to 3

Organosilicon resins were prepared in the same manner as in Example 1 except that the amount of the hexamethyldisiloxane and the amount of the aqueous 50% potassium hydroxide solution were changed as shown in Table 1. Using these organosilicon resins, resin premixes were prepared in the same manner as in Example 1, and their storage stability was examined in the same way. Polyurethane foams were also produced in the same way using these resin premixes to examine foam characteristics.

Results obtained are shown in Table 1.

TABLE 1

| | Formulation (molar ratio) | | | | Amount of alkali | | Premix stability | | |
|---|---|---|---|---|---|---|---|---|---|
| | M unit | $T^{3063}$ unit | $T^{13}$ unit | Q unit | Molar ratio to acid | Product | 50° C., 3 days | Density $Kg/m^3$ | Dimensional stability |
| Ex. 1 | 0.909 | 0.080 | 0.738 | 1.000 | 1.08 | resin | Good | 21 | good |
| Ex. 2 | 0.652 | 0.160 | 0.549 | 1.000 | 1.18 | resin | Good | 23 | good |
| Ex. 3 | 0.750 | 0.108 | 0.648 | 1.000 | 1.08 | resin | Good | 22 | good |
| Ex. 4 | 0.909 | 0.160 | 0.658 | 1.000 | 1.08 | resin | Good | 22 | good |
| Ex. 5 | 0.909 | 0.117 | 0.702 | 1.000 | 1.08 | resin | Good | 22 | good |
| Ex. 6 | 0.909 | 0.117 | 0.702 | 1.000 | 1.39 | resin | Good | 21 | good |
| Ex. 7 | 0.909 | 0.080 | 0.738 | 1.000 | 1.39 | resin | Good | 21 | good |
| Ex. 8 | 0.909 | 0.080 | 0.738 | 1.000 | 1.28 | resin | Good | 23 | good |
| Ex. 9 | 0.909 | 0.080 | 0.738 | 1.000 | 1.17 | resin | Good | 22 | good |
| Ex. 10 | 1.188 | 0.134 | 0.803 | 1.000 | 1.08 | resin | Good | 21 | good |
| Cp. 1 | 0.700 | 0 | 0 | 1.000 | 1.55 | resin | Separated and settled | 37 | poor |
| Cp. 2 | 0.700 | 0 | 0 | 1.000 | 1.08 | resin | Separated and settled | 22 | poor |
| Cp. 3 | 0.700 | 0 | 0 | 1.000 | 1.08 | resin | Separated and settled | 22 | good |

(Remarks)
Ex.: Example
Cp.: Comparative Example
M unit: $R^1{}_3SiO_{1/2}$ unit
$T^{3063}$ unit: $R^2SiO_{3/2}$ unit ($R^2$ = hexyl group)
$T^{13}$ unit: $R^2SiO_{3/2}$ unit ($R^2$ = methyl group)
Q unit: $SiO_2$ unit As described above, the organosilicon resin obtained by the production process of the present invention is well dispersible in the resin premix of the polyurethane foam composition and also is highly hydrophobic and low reactive. Hence, the resin premix in which this organosilicon resin has been added is improved in storage stability and may hardly cause separation of additives (organosilicon resin) and deterioration due to alkali catalysts even when stored over a long period of time. Accordingly, this resin premix need not be agitated when used and also can provide polyurethane foams having superior properties such as dimensional stability. It is also possible to produce polyurethane foams by spray foaming.

What is claimed is:

1. A process for producing a polyurethane foam by blowing and curing a polyurethane foam composition comprising a polyol, water, a catalyst, a surfactant and a polyisocyanate;

said process comprising the step of mixing a resin premix comprising the polyol, the water, the catalyst and the surfactant, with the polyisocyanate to cause the composition to foam and cure;

said resin premix containing an organosilicon resin having as structural units an $R^1{}_3SiO_{1/2}$ unit wherein the $R^1$'s are the same or different and each represents a monovalent hydrocarbon group having 1 to 6 carbon atoms, an $R^2SiO_{3/2}$ unit wherin $R^2$ represents a monovalent hydrocarbon group having 1 to 20 carbon atoms, and an $SiO_{4/2}$ unit;

wherein said organosilicon resin is produced by a process comprising the steps of:

subjecting a mixture of a compound selected from the group consisting of a silane compound represented by the general formula (I):

$$Si(OR^3)_4 \qquad (I)$$

wherein the $R^3$'s are the same or different and each represents a monovalent hydrocarbon group having 1 to 6 carbon atoms, and a hydrolysis-condensation product thereof;

a compound selected from the group consisting of a silane compound represented by the general formula (II):

$$R^2Si(OR^4)_3 \qquad (II)$$

wherein $R^2$ represents a monovalent hydrocarbon group having 1 to 20 carbon atoms, and the $R^4$'s are the same or different end each represents a monovalent hydrocarbon group having 1 to 6 carbon atoms, and a hydrolysis-condensation product thereof; and a silane compound represented by the general formula (III):

$$R^1{}_3SiX \qquad (III)$$

wherein X represents an —OH group, an —OSiR$^1{}_3$ group or a hydrolyzable group, and the $R^1$'s are the same or different and each represent a monovalent hydrocarbon group having 1 to 6 carbon atoms;

to equilibration reaction with an acid;

adding water to the product of the equilibration reaction to carry out hydrolysis reaction; and adding an aqueous alkali to the product of the hydrolysis reaction to carry out condensation reaction.

2. The process of claim 1, wherein said organosilicon resin is in an amount of from 0.01 part by weight to 20 parts by weight based on 100 parts by weight of the polyol.

3. The process of claim 1, wherein the catalyst, the water and the surfactant are present in amounts of from 0.0001 to 0.1, from 0.0001 to 0.1 and from 0.001 to 0.5, respectively, in a weight ratio of the respective components to the polyol, and wherein the polyisocyanate is present in an amount that gives an isocyanate index of 50 to 150.

4. The process of claim 1, wherein the silane compound represented by the general formula (II) is a mixture of the compound of the general formula (II) wherein $R^2$ is a methyl group and the compound of the general formula (II) wherein $R^2$ is a monovalent hydrocarbon group having 3 to 10 carbon atoms.

5. The process of claim 1, wherein the silane compound represented by the general formula (I) is selected from the group consisting of tetramethoxysilane, tetraethoxysilane, tetraisopropoxysilane, tetrabutoxysilane, and hydrolysis-condensation products thereof, methyl silicate and ethyl silicate.

6. The process of claim 1, wherein the silane compound represented by the general formula (II) is selected from the group consisting of methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, and hydrolysis-condensation products of these.

7. The process of claim 1, wherein the silane compound represented by the general formula (III) is selected from the group consisting of trimethylsilanol, triethylsilanol, trimethylchlorosilane, triethylchlorosilane, trimethylmethoxysilane, trimethylethoxysilane, trimethylsilyldimethylamine, trimethylsilyldiethylamine, trimethylacetoxysilane and hexamethyldisiloxane.

8. The process of claim 1, wherein the acid used in the equilibration reaction is a sulfonic acid or sulfuric acid.

9. The process of claim 1, wherein the aqueous alkali is selected from the group consisting of aqueous potassium hydroxide solution, aqueous sodium hydroxide solution, aqueous ammonia, aqueous dimethylamine and aqueous diethylamine.

10. The process of claim 1, wherein, in a mixture of the silane compounds used in the equilibration reaction, the silane compound represented by the general formula (II) and/or the hydrolysis-condensation product thereof is contained in such an amount that 0.5 to 1.0 mole of the $R^2SiO_{3/2}$ unit is present per mole of the $SiO_{4/2}$ unit in the silane compound represented by the general formula (I) and/or the hydrolysis-condensation product thereof, and the silane compound represented by the general formula (III) and/or the hydrolysis-condensation product thereof is contained in such an amount that 0.5 to 1.5 moles of the $R^1_3SiO_{1/2}$ unit is present per mole of the $SiO_2$ unit in the silane compound represented by the general formula (I) and/or the hydrolysis-condensation product thereof.

11. The process of claim 1, wherein the acid used in the equilibration reaction is added in an amount of from 0.5 to 2% by weight based on the weight of a mixture of the silane compounds used in the equilibration reaction, and the water is added in an amount of from 0.5 to 1.5 moles per mole of hydrolyzable groups contained in the mixture of the silane compounds.

* * * * *